United States Patent
Fisher et al.

[15] 3,653,188
[45] Apr. 4, 1972

[54] DUST COLLECTOR

[72] Inventors: Ervin Fisher; Jay Warshawsky, both of Allentown, Pa.

[73] Assignee: Fuller Company

[22] Filed: June 18, 1970

[21] Appl. No.: 47,466

[52] U.S. Cl. ................................... 55/283, 55/272, 55/302
[51] Int. Cl. ........................................................ B01d 19/00
[58] Field of Search .................................... 55/272, 283, 302

[56] References Cited

UNITED STATES PATENTS

| 3,394,532 | 7/1968 | Oetiker | 55/302 |
| 3,521,430 | 7/1970 | Vanderlip et al. | 55/283 |
| 3,543,483 | 12/1970 | Sheehan | 55/283 X |
| 3,545,178 | 12/1970 | Sheehan | 55/283 X |

*Primary Examiner*—Howard R. Caine
*Attorney*—Jack L. Prather and Frank H. Thomson

[57] ABSTRACT

A dust collecting apparatus of the filter bag type including a housing having a plurality of filter bags mounted therein. Dirty gas flows into the inside of the bags and passes therethrough to an exhaust conduit. The dust in the gas is deposited on the inside surface of the bags. A reverse flow of clean air is used to clean the bags. This reverse flow collapses the bags and the collected dust falls into a hopper. A baffle arrangement controls the flow of clean air. Magnetically actuated reed switches mounted on some of the bags are used to control the baffle arrangement and thus the flow of clean air. In one form of the invention, a motor gradually opens a baffle in the clean air line to gradually increase the rate of clean air flow. When the bags collapse a predetermined amount, the reed switches are opened and the motor stops to thereby prevent a further increase in the reverse air flow and a further collapse of the bags.

15 Claims, 5 Drawing Figures

PATENTED APR 4 1972 3,653,188

INVENTORS
ERVIN FISHER
JAY WARSHAWSKY
BY
Frank H. Thomson
Jack L. Prather
ATTORNEY

3,653,188

DUST COLLECTOR

BACKGROUND OF THE INVENTION

This invention relates to air filtering apparatus and in particular to a bag house dust collector for use in filtering dirty gas and to apparatus for cleaning the filter bags.

Bag house filters have been known for many years. One type of bag house filter includes a plurality of elongated flexible fabric filter bags which are mounted in a housing. Gas to be filtered is conducted into the housing to the inside of the filter bags and flows through the bags to a clean gas exhaust. The dust and pollutants in the gas are deposited on the inside of the filter bags.

A known method of cleaning the bags is to stop the flow of dirty gas into the housing and induce a reverse flow of cleaning air through the filter bags. This reverse flow loosens the deposited dust and pollutants from the surface of the bag and permits them to fall into a hopper.

During the reverse air cycle, the filter bags will collapse. If the bags collapse too much, they will pinch off and prevent a thorough cleaning of the bag. In addition, it has been found through experience that if the filter bags collapse too much, the bags will tend to wear out and fail sooner than otherwise would be the case. This is because cylindrical bags, when collapsed, tend to form a three or four lobed shape in cross section. Once a shape has been established, each time the bag is collapsed, the same shape will be formed with the lobes of the shape being at the same location on the circumference of the bag. The lobes of the shape are where maximum wear of the filter bags usually occurs. It is believed that wear caused by this continued collapsing can be substantially reduced by limiting the amount the bag collapses.

Prior to the present invention, one attempt at preventing excessive collapsing of the filter bags included providing a damper in the reverse air duct for controlling the rate of reverse air flow. This damper is responsive to the inlet pressure of the reverse air fan. Although this arrangement does provide some measure of control, it has not been altogether satisfactory. The amount the bag collapses is not always reflected by the inlet pressure of the reverse air fan. Although when initially installed, this system may be satisfactory, as loading of the dust collector varies, this arrangement becomes less responsive to the conditions as they actually exist.

SUMMARY

It is the principal object of this invention to provide a bag house dust collecting apparatus which insures longer filter bag life.

It is another object of this invention to provide a bag house dust collecting apparatus in which the filter bags are cleaned by a reverse air flow and includes apparatus for limiting the amount the filter bags are collapsed.

It is a further object of this invention to provide a bag house dust collecting apparatus in which the filter bags are cleaned by a reverse flow of air and includes apparatus responsive to the collapse of the filter bags for limiting the amount the filter bags collapse.

In general, the foregoing and other objects will be carried out by providing a dust collecting apparatus comprising: a housing; at least one flexible fabric filter bag mounted in said housing and having internal and external surfaces; means for supplying gas to be cleaned to one of said internal and external surfaces for passage through said filter bag whereby dust in said gas is deposited on one side of said internal and external surfaces; means for exhausting cleaned gas from the other of said surfaces; means for removing dust deposited on one of said internal and external surfaces of said filter bag including means for deforming said filter bag; and means responsive to the deformation of the filter bag for limiting the amount said filter bag is deformed.

BRIEF DESCRIPTION OF THE DRAWING

The invention will be described in connection with the annexed drawing wherein.

DESCRIPTION OF THE PREFERRED EMBODIMENT

Figure 1:
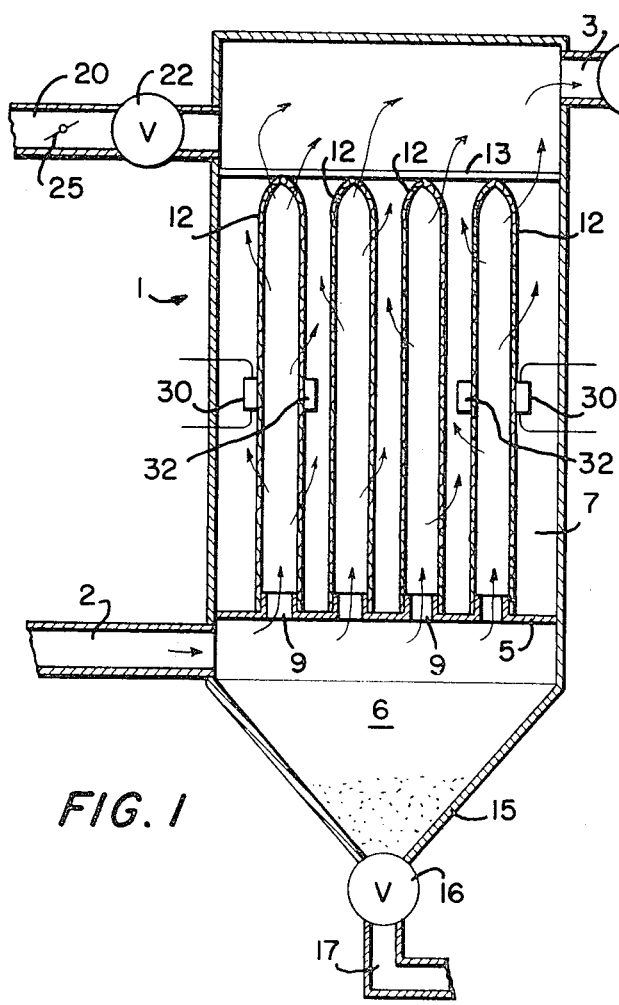
FIG. 1 is a sectional view of a bag house dust collecting apparatus of the present invention.
Figure 2:
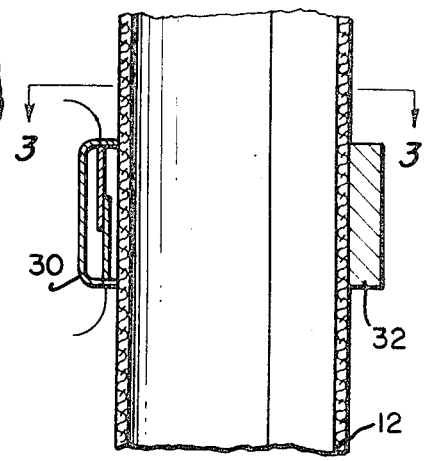
FIG. 2 is a fragmentary sectional view on an enlarged scale of a portion of FIG. 1.

In FIG. 1 there is shown a bag house dust collecting apparatus including a housing generally indicated at 1 having an inlet 2 for dirty gas and an outlet 3 for cleaned gas. The outlet 3 is provided with a valve 4 mounted therein for opening and closing the conduit 3. The cleaned gas outlet may be connected to a suitable source of reduced pressure such as the inlet of a blower. A tube sheet 5 is disposed within the housing 1 and defines a first chamber 6 and a second chamber 7. The tube sheet 5 is provided with a plurality of openings 9 therethrough. A plurality of elongated flexible fabric filter bags 12 are mounted in the housing 1 and chamber 7 and secured to the tube sheet 5 at one end and hanger means such as bar 13 at their other end. The inside of each of the bags 12 is in communication with the chamber 6 through the openings 9.

The bottom of the housing includes a hopper 15 which is coextensive with the first chamber 6 for receiving collected dust. A gate valve or rotary air lock 16 is provided in the bottom of the hopper which permits the collected dust to be discharged to suitable apparatus such as conduit 17 for disposing of the dust.

A reverse air duct 20 is connected to atmosphere or other source of clean air and to the housing 1 and chamber 7. A valve 22 is mounted in the duct 20 for selectively opening and closing this duct. When the duct 20 is open, it is in flow communication with the outside of the bags 12. A suitable motor controlled baffle means 25 is mounted in the duct 20 for controlling the rate of air flow through duct 20.

Figure 3:
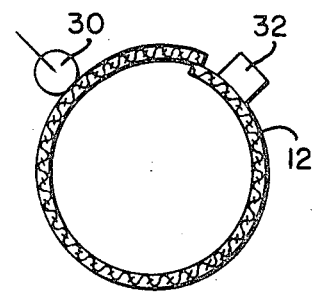
FIG. 3 is a sectional view taken on the line 3—3 of FIG. 2 in the direction of the arrows.

A magnetically actuated normally closed reed switch 30 is mounted on at least one and preferably more than one of the filter bags 12. A magnet 32 is mounted on each of the filter bags on which a reed switch 30 is mounted. A shown in FIG. 3, the reed switch 30 and the magnet 32 are mounted on opposite sides of the filter bag 12. The switches 30 are shown as being located in the approximate longitudinal center of the bags but may be at other locations.

Figure 5:
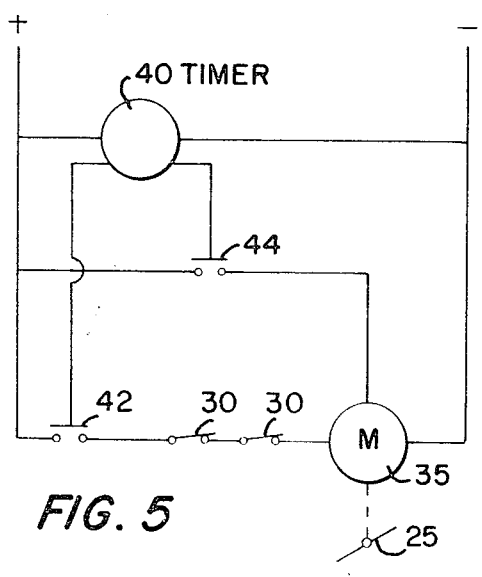
FIG. 5 is a schematic diagram of one form of electrical apparatus employed by the present invention.

As shown in FIG. 5, a motor 35 is operatively connected to the baffle 25 and is connected in series with each of the reed switches 30. A timer 40 is provided for connecting the motor 35 and switches 30 to a source of electrical power by means of switches 42 and 44.

It should be understood that in practice, a dust collector installation will normally include a plurality of dust collectors such as that shown in FIG. 1 with the inlet duct 2 and cleaned gas duct 3 connected to each of the dust collector housings as well as to the source of dirty gas and reduced pressure, respectively.

When gas is being cleaned, the valve 22 in conduit 20 is fully closed and valve 4 in conduit 3 is fully opened. A reduced pressure is applied to chamber 7 through conduit 3 and draws gas to be cleaned into chamber 6 through conduit 2. The dirty gas is drawn up through opening 9 in tube sheet 5 to the inside of the filter bags 12. The gas passes through the fabric bags into chamber 7 and dust and pollutants are deposited on the internal surface of the bags 12. Cleaned gas which passes through the bags 12 leaves the chamber 7 through the conduit 3.

Figure 4:
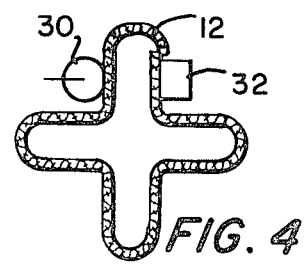
FIG. 4 is a view similar to FIG. 3 but with the filter bag collapsed as during cleaning operations.

When it is desired to clean the filter bags 12, the valve 4 is closed and the valve 22 is fully opened. At the same time, or after a slight delay, timer 40 operates to close switch 42 and permit current to flow to the motor 35 to operate this motor and begin to slowly open baffle 25. Because conduit 2 is open to other dust collecting apparatus similar to that shown in FIG. 1, the closing of valve 4 will cause the termination of dirty gas flow into the collector shown and the chamber 6 of the collector shown will be subjected to a reduced pressure or suction through conduit 2. This suction will cause a flow of cleaning air through conduit 20 into the collector shown. Cleaning air will flow into chamber 7 and through the filter bags 12 in a reverse direction toward conduit 2. This reverse flow of cleaning air plus the differential pressure across the bag will collapse the filter bag 12 and the dust and pollutants previously deposited on the inside of the bag will be loosened and fall into the hopper 15. When the filter bags collapse, they form in cross section a lobed shape such as that shown in FIG. 4. Once a particular shape is established, repeated collapsing of the bag will cause the same shape to be formed with the lobes being formed at the same location on the circumference of the filter bag.

By the present invention, an arrangement has been provided to limit the amount the bag collapses to thereby prevent pinching off of the bag and undue wear caused by too tight a collapse. A normally closed reed switch is mounted on at least one of the bags 12 in the housing 1 and a magnet is mounted so that when the bag is collapsed, it will be on the same lobe of the bag, opposite a reed switch. When any one of the bags equipped with a reed switch is collapsed a certain amount, the magnet opens the corresponding reed switch 30 to prevent current flow to motor 35. This prevents further opening of baffle 25 which results in a fixed rate of flow of air through the bags in a reverse direction. Thus, the bags are held in a fixed collapsed position prevented from further collapsing or pinching off.

After a certain amount of time, the valve 22 will be closed and the valve 4 will be open. This stops the reverse flow of air to a particular housing 1 and reinstates the flow of dirty air through conduit 2. Slightly after this time, the timer will deactivate switch 42 and activate switch 44 to permit the motor 35 to move the baffle 25 to the fully closed position and be ready for the next bag cleaning operation.

In the embodiment shown and described, the proximity sensors or reed switches have been used to fix the rate of flow of reverse or cleaning air into the collector. If desired, the reed switches could be used to open and close the cleaning air valve 22. In such an application, when the filter bags collapsed a certain amount, the reed switch would be activated to close the cleaning air valve 22. The filter bags 12 would reinflate and the valve 22 would open again to permit reverse air flow to begin again. If such arrangement was to be used, several collapse and reinflate cycles would be used for each cleaning cycle. A timer could be used to control the total time period for the complete cleaning cycle. The important feature of the present invention is that the apparatus for controlling the amount the filter bags collapse is responsive to the amount the filter bags collapse.

In the embodiment shown, a suction arrangement has been shown. The invention is equally applicable to a positive pressure dust collecting apparatus where the outlet of a blower is connected to the line 20 for supplying cleaning air to the chamber 7 or other collector arrangements in which a reverse air flow or differential pressure is used to collapse the filter bags.

In the foregoing description, "gas" has been used to described the gaseous material being cleaned and "air" has been used to describe the gaseous medium used to clean the filter bags. It is to be understood that any gas can be filtered and any gas can be used as a cleaning medium.

It is to be understood that the foregoing is the description of a single embodiment and that certain modifications could be made without departing from the scope of the present invention. It is intended that the invention be limited solely by that which is within the appended claims.

We claim:
1. A dust collecting apparatus comprising:
a housing;
at least one flexible fabric filter bag mounted in said housing and having internal and external surfaces;
means for supplying gas to be cleaned to said internal surface for passage through said filter bag whereby dust in said gas is deposited on said internal surface;
means for exhausting cleaned gas from the said external surface;
means for removing dust deposited on said internal surface of said filter bag including means for collapsing said filter bag; and
means responsive to the collapse of the filter bag for limiting the amount said filter bag collapses.

2. The dust collecting apparatus of claim 1 further comprising a tube sheet mounted in said housing and dividing said housing into first and second chambers and having at least one opening therein; said filter bag being open at one end and secured to said tube sheet so that its open end is in communication with the opening in said tube sheet and the filter bag is positioned in the second chamber.

3. The dust collecting apparatus of claim 2 wherein said means for supplying gas to be cleaned is flow connected to one of said first and second chambers and the means for exhausting cleaned gas is flow connected to the other of said first and second chambers.

4. The dust collector of claim 3 wherein said means for supplying gas to be cleaned is flow connected to said first chamber and said means for exhausting cleaned gas is flow connected to said second chamber and said means for collapsing said filter bag includes means for selectively connecting said second chamber to a source of clean air, means for preventing gas to be cleaned from being supplied to said first chamber and means for applying a reduced pressure to the inside of the filter bag whereby said filter bag is collapsed and dust which is deposited on the internal surface of the filter bag is removed from said bag.

5. The dust collector of claim 4 wherein said means for selectively connecting said second chamber to a source of clean air includes damper means for controlling the supply of clean air to the second chamber.

6. The dust collector of claim 5 wherein said means responsive to the amount said filter bag collapses is a position response switch mounted on said filter bag for controlling said damper means.

7. The dust collector of claim 6 wherein said switch is a magnetically actuated reed switch.

8. The dust collector of claim 6 further comprising hopper means coextensive with said first chamber for collecting and discharging dust from the collector.

9. The dust collector of claim 1 wherein said means for limiting the amount the filter bag collapses includes a position responsive switch mounted on the filter bag.

10. In a dust collecting apparatus including a housing having a hopper for discharging collected dust, first duct means for supplying gas to be cleaned to the inside of said housing, second duct means for exhausting cleaned gas from the inside of said housing, a plurality of flexible fabric filter bags mounted in said housing, and means for directing gas to be cleaned to the inside of said filter bags whereby the gas passes through the filter filter bags and dust is deposited on the inside of the filter bags, means for removing the dust deposited on the inside of the filter bag from the inside of the filter bags comprising:
means for selectively supplying clean air to the inside of the housing on the outside of the filter bags at a pressure greater than the pressure on the inside of the filter bags to thereby cause said filter bags to collapse and the dust deposited on the inside of the filter bags to fall into the hopper; and
means responsive to the collapse of the filter bags for limiting the amount said filter bags collapse.

11. The dust collecting apparatus of claim 10 wherein said means for selectively supplying clean air to the inside of the housing includes means for selectively connecting the inside of the housing to a source of clean air and means for substantially preventing gas to be cleaned from being supplied to the inside of the housing.

12. In the dust collecting apparatus of claim 11, said means for removing the dust further comprising baffle means mounted in said means for supplying clean air to the inside of the housing for controlling the flow of clean air to the inside of the housing and means for controlling said baffle means.

13. In the dust collecting apparatus of claim 12, said means for controlling said baffle means includes motor means operatively connected to said baffle means for opening and closing said baffle means and position actuated switch means mounted on at least one of said filter bags and operatively connected to said motor means to thereby define said means for limiting the amount the filter bags collapse.

14. In the dust collecting apparatus of claim 13, said position actuated switch means is a magnetically actuated reed switch which opens when the filter bag on which it is mounted collapses a predetermined a mount.

15. A dust collecting apparatus comprising: a housing; at least one flexible fabric filter bag mounted in said housing and having internal and external surfaces; means for supplying gas to be cleaned to one of said internal and external surfaces for passage through said filter bag whereby dust in said gas is deposited on one of said internal and external surfaces; means for exhausting cleaned gas from the other of said internal and external surfaces; means for removing dust deposited on one of said internal and external surfaces of said filter bag including means for deforming said filter bag; and means responsive to the deformation of the filter bag for limiting the amount the filter bag is deformed.

* * * * *